US012449103B2

(12) United States Patent
Sena et al.

(10) Patent No.: US 12,449,103 B2
(45) Date of Patent: Oct. 21, 2025

(54) FLAMELESS CANDLE WITH MOVING SUPPORT FOR FLAME ELEMENT

(71) Applicant: Sterno Home Inc., Vancouver (CA)

(72) Inventors: Dario Sena, Longueuil (CA); Lucian Hurduc, Ste-Julie (CA)

(73) Assignee: STERNO HOME INC., Vancouver (CA)

( * ) Notice: Subject to any disclaimer, the term of this patent is extended or adjusted under 35 U.S.C. 154(b) by 0 days.

(21) Appl. No.: 17/725,698

(22) Filed: Apr. 21, 2022

(65) Prior Publication Data

US 2022/0341555 A1 Oct. 27, 2022

Related U.S. Application Data

(60) Provisional application No. 63/236,449, filed on Aug. 24, 2021, provisional application No. 63/178,162, filed on Apr. 22, 2021.

(51) Int. Cl.
*F21S 10/04* (2006.01)
*F21S 6/00* (2006.01)

(52) U.S. Cl.
CPC ............ *F21S 10/046* (2013.01); *F21S 6/001* (2013.01)

(58) Field of Classification Search
CPC .......... F21S 10/046; F21S 6/001; F21S 10/04; F21S 10/043
See application file for complete search history.

(56) References Cited

U.S. PATENT DOCUMENTS 8,733,986 B2 5/2014 Hau et al.
9,322,522 B2 4/2016 Hau et al.
9,574,748 B2 2/2017 Dong
9,585,980 B1 3/2017 Li
9,657,910 B2 5/2017 Patton
(Continued)

FOREIGN PATENT DOCUMENTS

CN 203980132 U * 12/2014 .............. F21S 10/04
CN 105765297 A 7/2016
(Continued)

OTHER PUBLICATIONS

Dai, Electronic simulation candle, Dec. 3, 2014, CN203980132U (Year: 2014).*
(Continued)

*Primary Examiner* — Jong-Suk (James) Lee
*Assistant Examiner* — James M Endo
(74) *Attorney, Agent, or Firm* — Knobbe Martens Olson & Bear LLP

(57) ABSTRACT

A flameless candle may include: a frame; a light source configured to project light; a flame element including a body, an interior region within the body, an interior surface between the interior region and the body, and an outer surface of the body, wherein the flame element is configured to receive the light in the interior region, such that the light passes through the interior surface, then through the body, and then through the outer surface of the body; and at least one support arm coupling the flame element to the frame, wherein the flame element is configured to receive a mechanical force and responsively move with respect to the frame, and wherein the at least one support arm includes a flexible material.

20 Claims, 17 Drawing Sheets

(56) References Cited

U.S. PATENT DOCUMENTS

| | | | | |
|---|---|---|---|---|
| 9,885,452 | B2 | 2/2018 | Yuan | |
| 9,915,402 | B2 | 3/2018 | Dong | |
| 10,060,586 | B1 * | 8/2018 | Chen | F21S 10/046 |
| 10,082,274 | B2 | 9/2018 | Dong | |
| 10,578,263 | B2 | 3/2020 | Dong | |
| 10,578,281 | B2 | 3/2020 | Dong | |
| 11,085,612 | B2 | 8/2021 | Dong | |
| 11,092,302 | B2 | 8/2021 | Wu et al. | |
| 11,112,079 | B2 | 9/2021 | Hurduc et al. | |
| 11,300,261 | B2 | 4/2022 | Chan et al. | |
| 2006/0146544 | A1 * | 7/2006 | Leung | F21S 6/001 362/392 |
| 2014/0211458 | A1 * | 7/2014 | Lai | F21V 35/00 362/161 |
| 2014/0211499 | A1 | 7/2014 | Fong et al. | |
| 2016/0116127 | A1 * | 4/2016 | Patton | F21S 6/001 362/284 |
| 2016/0312969 | A1 * | 10/2016 | Patton | H05B 45/12 |
| 2017/0122511 | A1 * | 5/2017 | Ding | F21V 17/002 |
| 2017/0368219 | A1 * | 12/2017 | Li | C11C 5/00 |
| 2018/0010750 | A1 * | 1/2018 | Cheng | F21S 10/043 |
| 2018/0347772 | A1 * | 12/2018 | Lin | F21S 9/02 |
| 2019/0316747 | A1 * | 10/2019 | Dong | F21S 10/046 |
| 2020/0191348 | A1 * | 6/2020 | Fan | F21K 9/238 |
| 2020/0217469 | A1 * | 7/2020 | Fan | F21S 10/046 |
| 2021/0102672 | A1 * | 4/2021 | Cheng | F21S 10/046 |
| 2021/0102675 | A1 | 4/2021 | Dong | |
| 2021/0270435 | A1 | 9/2021 | Chan et al. | |

FOREIGN PATENT DOCUMENTS

| | | | | |
|---|---|---|---|---|
| CN | 107543113 | A | 1/2018 | |
| CN | 208457839 | U | 2/2019 | |
| CN | 210267016 | U | 4/2020 | |
| WO | WO-2013186875 | A1 * | 12/2013 | F21S 10/046 |
| WO | WO-2021000596 | A1 * | 1/2021 | F21S 10/043 |

OTHER PUBLICATIONS

Chan, LED Candle Lamp, Jan. 7, 2021, WO2021000596A1 (Year: 2021).*

Ichikawa, Illumination Device, 2013, WO-2013186875-A1 (Year: 2013).*

China National Intellectual Property Administration, “First Office Action,” for Chinese Patent Application No. 202210429571.1, Jul. 30, 2024.

* cited by examiner

FLAMELESS CANDLE WITH MOVING SUPPORT FOR FLAME ELEMENT

CROSS REFERENCE TO RELATED APPLICATIONS

This application claims priority to U.S. No. 63/178,162, filed on Apr. 22, 2021, and U.S. No. 63/236,449, filed on Aug. 24, 2021, the entireties of which are incorporated by reference herein.

BACKGROUND

Generally, this application relates to flameless candles (hereinafter, "candles"), and in particular, candles with flame elements that are movably supported.

SUMMARY

According to embodiments, flameless candle may include: a frame; a light source configured to project light; a flame element including a body, an interior region within the body, an interior surface between the interior region and the body, and an outer surface of the body, wherein the flame element is configured to receive the light in the interior region, such that the light passes through the interior surface, then through the body, and then through the outer surface of the body; and at least one support arm coupling the flame element to the frame, wherein the flame element is configured to receive a mechanical force and responsively move with respect to the frame, and wherein the at least one support arm includes a flexible material. The flameless candle may further comprise: a magnet coupled to the flame element; and an electromagnet magnetically coupled to the magnet, wherein the electromagnet causes the magnet to move, thereby causing the mechanical force received by the flame element. The flameless candle may further comprise a magnet coupler coupled to the flame element and the magnet, wherein the magnet coupler is configured to transfer movement of the magnet to the flame element. The flameless candle may further comprise a motor configured to generate the mechanical force. The light source may be configured to project a flickering light. The light source may not move. The at least one support arm may comprise two support arms, each coupling the flame element to the frame. The at least one support arm and the flame element may be integrated. The at least one support arm may comprise at least one of a thermoplastic elastomer, styrene-butadiene rubber, silicone rubber, a styrenic block copolymer, a thermoplastic polyolefin elastomer, a thermoplastic vulcanizate, a thermoplastic polyurethane, a thermoplastic copolyester, a thermoplastic polyamide, latex, rubber, polyisoprene, chloroprene, or nitrile rubber. The flameless candle may further comprise a shell including an upper surface having an aperture, and wherein the flame element extends through the aperture.

According to embodiments, a flameless candle may comprise: a light source configured to emit a light; a flame element including an interior region, an interior surface, and an exterior surface, wherein the flame element is configured to receive the light in the interior surface and permit the light to pass through to the exterior surface; and a moving component, wherein the moving component comprises a flexible portion including a first end and a second end, wherein the first end is coupled to the flame element and the second end is coupled to a non-moving portion of the flameless candle, such that the flame element and the first end of the moving component move together with respect to the non-moving portion of the flameless candle. The moving component may comprise a spring. The flameless candle may further comprise an electromagnet configured to selectively induce the moving component to move. The flameless candle may further comprise a magnet coupled to the flame element, wherein the electromagnet is configured to selectively induce the magnet to move, thereby causing the flame element to move. The moving component may comprise a ferromagnetic material, wherein the electromagnet is configured to selectively induce the ferromagnetic material to move, thereby causing the flame element to move. The moving component may be configured to receive an electrical current and responsively move. The light source may be configured to emit a flickering light. The light source may not move. The flameless candle may further comprise a shell including an upper surface having an aperture, and wherein the flame element extends through the aperture.

Figure 1:
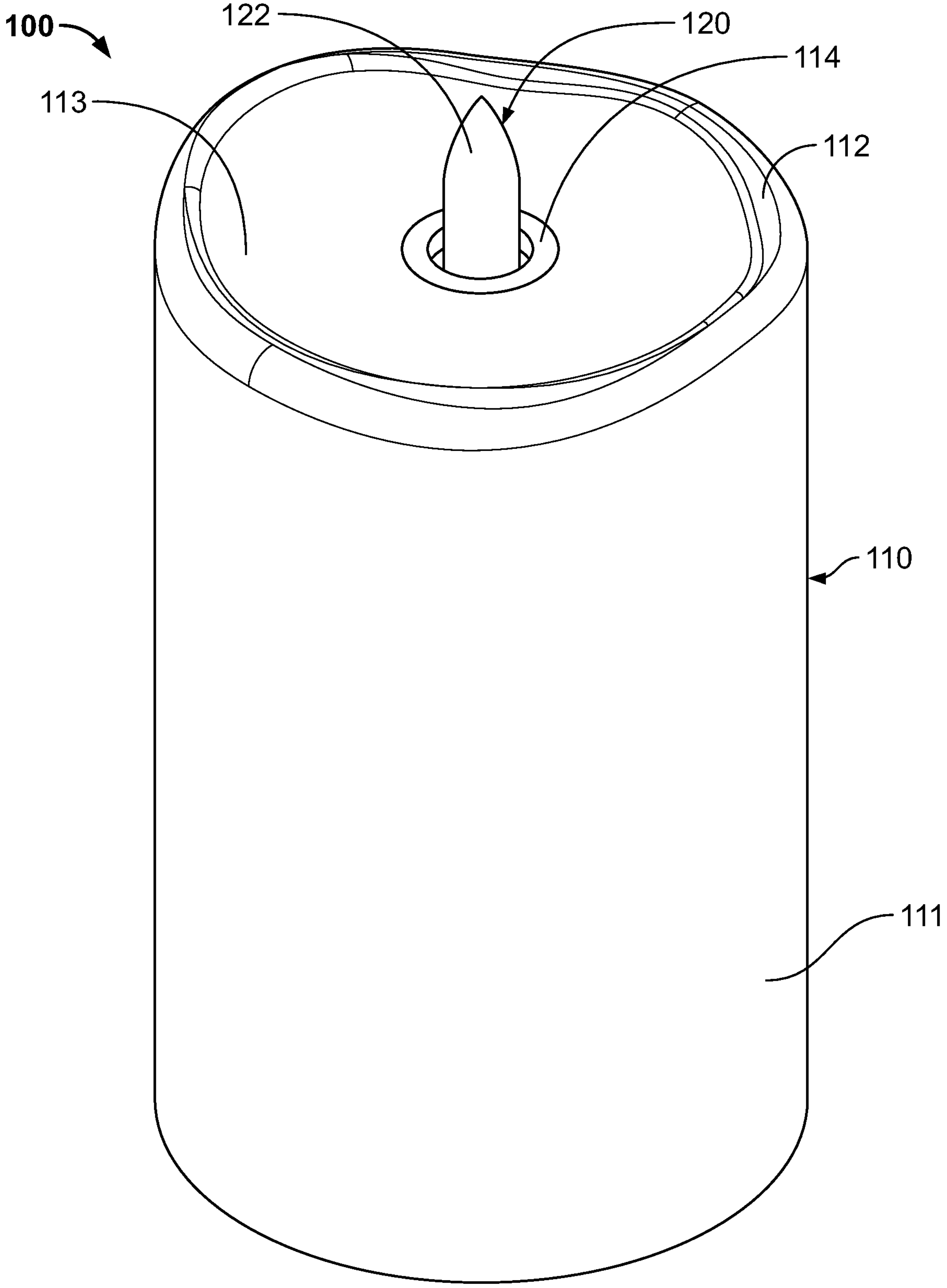
FIG. 1 illustrates a perspective view of an exterior of a candle, according to embodiments.
Figure 2:
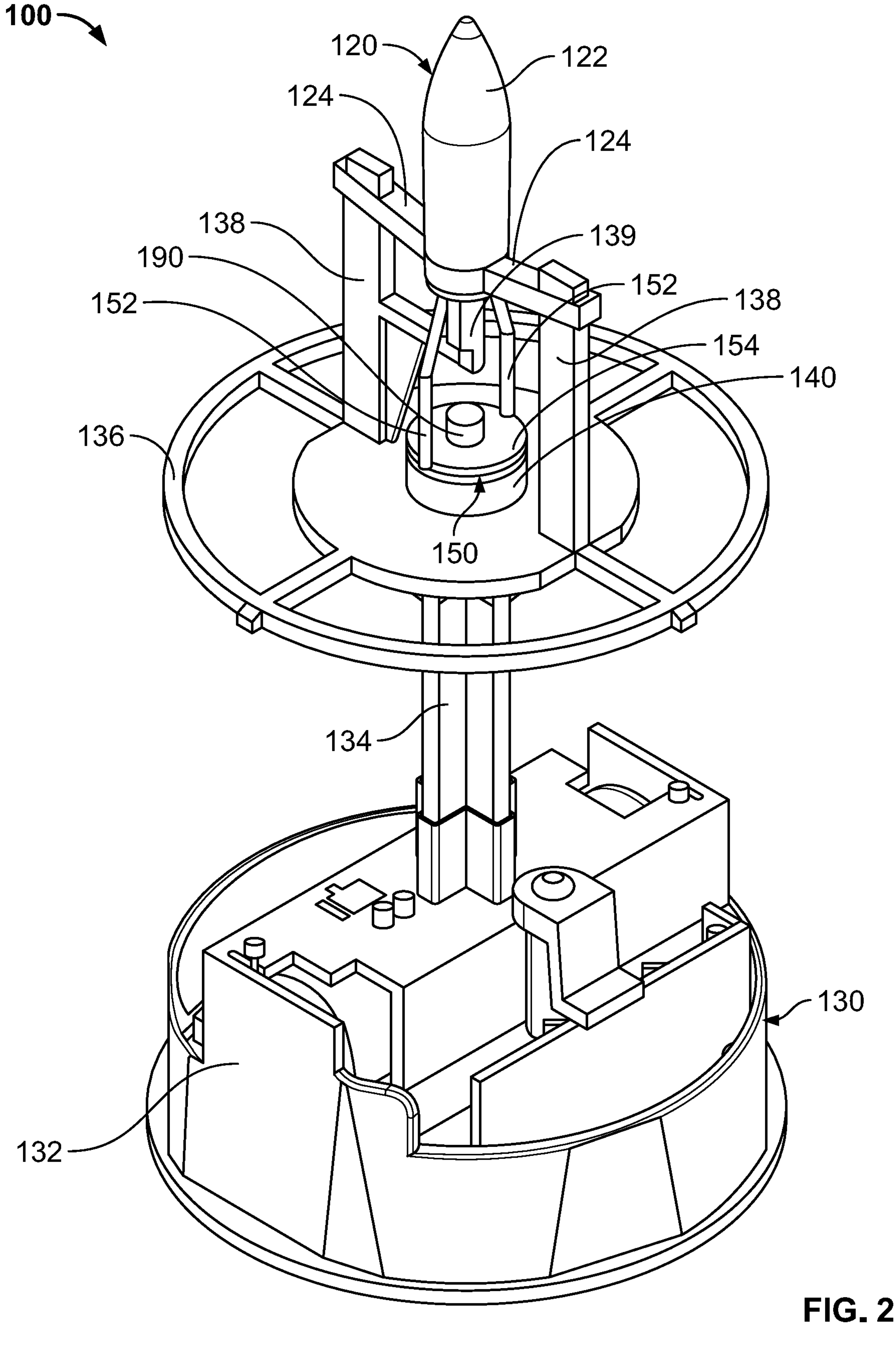
FIG. 2 illustrates a perspective view of an interior of the candle of FIG. 1, according to embodiments.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

FIGS. 1-9 illustrate different views and embodiments of candle 100. As shown in FIG. 1, candle 100 includes body 110 and flame element 120 (e.g., an element designed to present an illusion of a flame to a viewer). Body 110 includes sidewall 111, upper rim 112, upper surface 113, and aperture 114 in upper surface 113. Body 110 may include one or more interior regions within sidewall 111 and upper surface 113. Upper surface 113 may be recessed such that aperture 114 is at a lower elevation than at least part of rim 112. Upper surface 113, when recessed, may give the appearance that candle 100 that has been used and some of the wax has been consumed (that is, if candle 100 was not a flameless candle, but a conventional, flamed candle).

As shown in FIGS. 2-7, different views of candle 100 are shown that induce motion in flame element 120 via magnetic techniques. Candle 100 further may include frame 130 (FIGS. 2-9), electromagnet 140 (FIGS. 2-5 and 7), coupler 150 (FIGS. 2-5 and 7), light source 160 (FIGS. 3-5), power source 170 (FIGS. 3, 4, and 6), and magnet 190 (FIGS. 2-5 and 7). Candle 100 may include multiple ones of such components, such as multiple frames 130, electromagnets 140, couplers 150, light sources 160, power sources 170, and/or magnets 190.

Flame element 120 may include a light-receiving portion 122, a portion of which may resemble a candle flame, and may extend upwardly from aperture 114 in upper surface 113 of body 110. Light-receiving portion 122 may include an interior surface and an exterior surface. Light-receiving portion 122 may receive light emitted from light source 160 at the interior surface and may further pass through at least a portion of the light to the exterior surface. That is to say, at least a portion of light-receiving portion 122 of flame element 120 may be translucent or transparent. Alternatively, light-receiving portion 122 may receive light projected onto at least a portion of its exterior surface (not shown), in which case at least a portion of light-receiving portion 122 of flame element 120 may optionally be opaque. When arranged such that light projects onto an exterior surface of light-receiving portion 122, light-receiving portion 122 could be substantially flat or not have an interior region as do other flame element 120 embodiments disclosed herein.

Flame element 120 may include one or more support arms 124. Two support arms 124 are shown, but one or three or more support arms 124 are possible. Support arms 124 may be attached to, coupled to, and/or integrated with light-receiving portion 122. For example, support arms 124 and light-receiving portion 122 may be formed with one piece of material. Support arms 124 may be made of flexible material(s) that allow light-receiving portion 122 to move, as will be further described. Such material(s) may be one or more of a thermoplastic elastomer, styrene-butadiene rubber, silicone rubber, a styrenic block copolymer (TPS or TPE-s), a thermoplastic polyolefin elastomer (TPO or TPE-o), a thermoplastic vulcanizate (TPV or TPE-v), a thermoplastic polyurethane (TPU), a thermoplastic copolyester (TPC or TPE-E), a thermoplastic polyamide (TPA or TPE-A), latex, rubber, polyisoprene, chloroprene, or nitrile rubber. Light-receiving portion 122 may also include such material(s). Flame element 120 may include (e.g., be integrated with) additional pieces, such as coupler 150, described below.

Flame element 120 may move along at least three degree of movement or freedom, including three or more of back-forward, left-right, up-down, roll, yaw, or pitch. According to one technique, flame element 120 moves up-down, rolls, yaws, and pitches.

Flame element 120 may include one or more features on the interior surface and/or exterior surface of flame element 120. Such features may include ridges, ribs, or protrusions/recesses. The features may be shaped and positioned to enhance the illusion of a true flame by distorting the light as desired. For example, when light travels through light-receiving portion 121, the features may distort the light such that it appears to be more diffused. The features may have a sawtooth, arcuate, and/or Fresnel lens form(s). The features may be vertically and/or horizontally oriented. The features could be a mix of these forms or other forms. The features may be embossed, engraved, or laid over the flame element. Flame element 120 and/or features may include pigment to produce a desired light effect. According to one technique, phosphor can be applied to flame element 120. A blue LED (e.g., light source 160) can emit light onto the phosphor, thereby creating a white color. Phosphor paint could be injected in flame element 120 during manufacturing, or painted inside or outside flame element 120. According to a technique, only a portion of flame element 120 may be coated or infused with phosphor. For example, an upper region of flame element 120 may have the phosphor while a lower region does not. This may cause an illusion of a real candle flame with a blue region in the lower area and a white region in the upper area of flame element 120.

Frame 130 may provide non-moving (static) support for flame element 120 or other components. Frame may include base 132, riser 134, platform 136, support 138 for flame element 120, and support 139 for light source 160. One or more portions of frame 130 may include or be formed from a relatively rigid material, such as a polymeric material or flexible metal. Some components of frame 130 are shown as being separate from others, but one or more of these components may be integrated with each other.

Base 132 may house, support, or retain power source 170 or other circuitry (not shown) that controls operation of candle 100. Base 132 may include a feature to receive or couple with riser 134, or base 132 may be integrated with riser. Riser 134 may extend upwardly and couple with platform 136. Platform 136 may include a feature to receive riser 134, or these components may be integrated. Platform 136 may include an outer perimeter and an inner region. Outer perimeter or features thereon may engage or touch sidewall 111 body 110, and may provide a degree of stability of platform 136. Support 138 may extend upwardly from platform 136 (either integrated or attached), and support 139 may extend from support 138 (either integrated or attached).

Support arms 124 of flame element 120 may be secured to frame 130 (e.g., coupled directly or indirectly). Support arms 124 may be attached to support 138 or other parts of frame 130. For example, each support arm 124 may include a slot or aperture that mates with a corresponding feature in support 138 (example features shown as notches in support 138 in FIGS. 4 and 5). Support arms 124 may be attached in other ways to support 138, such as glued or otherwise adhered.

Light source 160 may be supported by frame 130 (e.g., support 139). As shown, support 139 includes hollow interior regions that receive leads 162 of light source 160. Body 161 of light source is positioned above or on support 139. Other parts of frame 130 may include hollow interior regions that receive wires routed from power source 170 and/or other circuitry to light source 160 and electromagnet 140. Light source 160 may extend into a hollow interior region of flame element 120 (e.g., light-receiving portion 122). Light source 160 may be positioned in other locations. In such a scenario, a light pipe (not shown) may be provided to pipe the light towards and/or into flame element 120 (e.g., light-receiving portion 122). Light source 160 may extend upwardly into and/or through aperture 114, or not.

Light source 160 may include at least one LED. Leads 162 may be substantially made of non-ferrous metal to reduce magnetic interferences. Leads 161 may be bent and/or coupled directly or indirectly to the frame. According to another technique, a surface mount LED may be used and supported directly or indirectly by frame 130. Light source 160 may vary in color or light intensity through pulse-width modulation, voltage change, current change, or other modulation techniques, for example, to reproduce the effect of a real flame or other desired effects. According to one technique, a processor is embedded in body 161 and is used to control the light-emitting part of light source 160 (e.g., the actual diode(s) in an LED). When light source 160 is turned ON or OFF, it may not move with respect to the frame 130 or other non-moving, static parts of candle 100.

Light source 160 may be optically coupled with a light pipe (not shown) that transmits the light from light source 160 to a different location with respect to flame element 120 (e.g., light source 160 may be located remotely from flame element 120, but light emitted by light source 160 may be piped to flame element 120). Such a light pipe may include a material such as optical fiber (e.g., fibers formed from glass or plastic) or acrylic. The use of a light pipe can allow the light source to be positioned at any of a variety of suitable locations. The light pipe may terminate above or below aperture 114. The light pipe may terminate within or below flame element 120, such that light is internally projected from flame element 120.

Light source 160 may be housed in the inner region of candle body 110 or may be outside. If light source 160 is housed in the interior region of the candle body 110, light source 160 may emit light through aperture 114 in upper surface 113 of candle body 110. Light source 160 may alternatively be positioned above aperture 114, and may be positioned within flame element 120. The light source may project light into a lens that modifies the shape of the light beam in such a way that renders the light effect from the flame element more realistically. The lens may be positioned closely to the light source such that it directs light toward the flame element. An opaque material such as a sleeve, paint, stain or shrink tube may be wrapped around the light source, light pipe, or lens in such a way that it would recreate the look of a burned candle wick.

Electromagnet 140 may be coupled or attached to frame 130, such as on platform 136. Electromagnet 140 may control magnetic fields as will be described below. Electromagnet 140 may include one or more coils of a conductor, such as wire coil(s) or coiled trace(s) on a printed circuit board. Electromagnet 140 may cause flame element 120 to move via magnet 190 and coupler 150, as further described. The electromagnetic field generated by electromagnet 140 over time may be random, pseudo-random, or other may be the result of other techniques that modulate timing and electromagnetic field frequencies and amplitudes. Electromagnet 140 may change polarity (positive to negative and/or negative to positive) over time to assist with such effects.

Electromagnet 140 may generate at least two electromagnetic fields levels, so that the magnet(s) moves in reaction to the changing electromagnetic fields levels. The electromagnetic pulses could be the same or opposite polarity as the magnet(s). Same polarity electromagnetic pulses may generate an upward movement with subsequent natural oscillation in other directions that appear random. Opposite polarity electromagnetic pulses may generate a downward movement with subsequent natural oscillation in other directions that appear random. The timing and frequency of the electromagnetic pulses may allow to create different movement behaviors so as to reproduce the effect of a natural flame.

Coupler 150 may be directly or indirectly coupled to flame element 120 and magnet 190. Coupler 150 may include or be formed of a rigid material. Coupler 150 may be one integrated pieces, or an assembly of smaller pieces. Coupler 150 may include a magnet holder 154, connector 156, and extension(s) 152. Magnet holder 154 may hold or receive magnet 190. As will be further described, magnet 190 may interact with electromagnet 140. In an embodiment, magnet 190 may be attached to or integrated with flame element 120, in which case it may be possible to omit coupler 150.

Coupler 150 may attach to flame element 120 via connector 156. Connector 156 may attach, for example, to the light-receiving portion 122. Connector 156 may attach to flame element via adhesive, friction fit, or otherwise. According to one technique, flame element 120 is formed from an elastic material. Connector 156 may be inserted into a hollow interior region of flame element 120 and the pieces are connected by a force due to elasticity of flame element 120. Connector 156 could include a hollow interior region, or open region that receives support 139 and/or light source 160. One or more portions of coupler 150 could also be integrated with one or more portions of flame element 120.

Magnet holder 154 may be located underneath or below connector 156. Magnet 190 may attach to magnet holder 154 via adhesive, friction fit, or other means. Magnet 190 may also attach to connector 156. Multiple magnets 190 may attach to the same or different portions of coupler 150 (e.g., all portions discussed herein). Magnet 190 could be fixed on magnet holder 154 at various angles so that magnetic forces of magnet 190 are pointing in a desired position. If magnet 190 is arrange provide more vertical magnetic forces, this would cause greater vertical movement of portions of coupler 150 and portions of flame element 120. If magnet 190 is arranged to provide more horizontal forces, this would cause greater horizontal movement of portions of coupler 150 and portions of flame element 120.

One or more extensions 152 (two shown) connect connector 156 to magnet holder 154. Extensions 152 may form an open area such that when coupler 150 moves, it may not be substantially impeded by other components in candle 100, such as support 139 and/or portions of light source 160. The length of extensions 152 may be selected to determine or influence oscillating frequencies and amplitudes of the motion of flame element 120.

Power source 170 (e.g., AA batteries as shown) may be housed inside body 110 or frame 130. As another option, candle 100 may be powered from an external source. Candle 100 may also include one or more solar cells to generate power from external light.

Candle 100 shown in FIGS. 1-7 may operate as follows. A user turns candle 100 ON, such that light source 160 is energized and emits light but does not move. When candle 100 is turned ON, electromagnet 140 is also energized, thereby generating an electromagnetic field, which interacts with magnet 190. Coupler 150 is attached to magnet 190 and flame element 120. Movement of magnet 190 due to the electromagnetic field is transferred to coupler 150 and flame element 120, which can move because support arms 124 are flexible.

Figure 8:
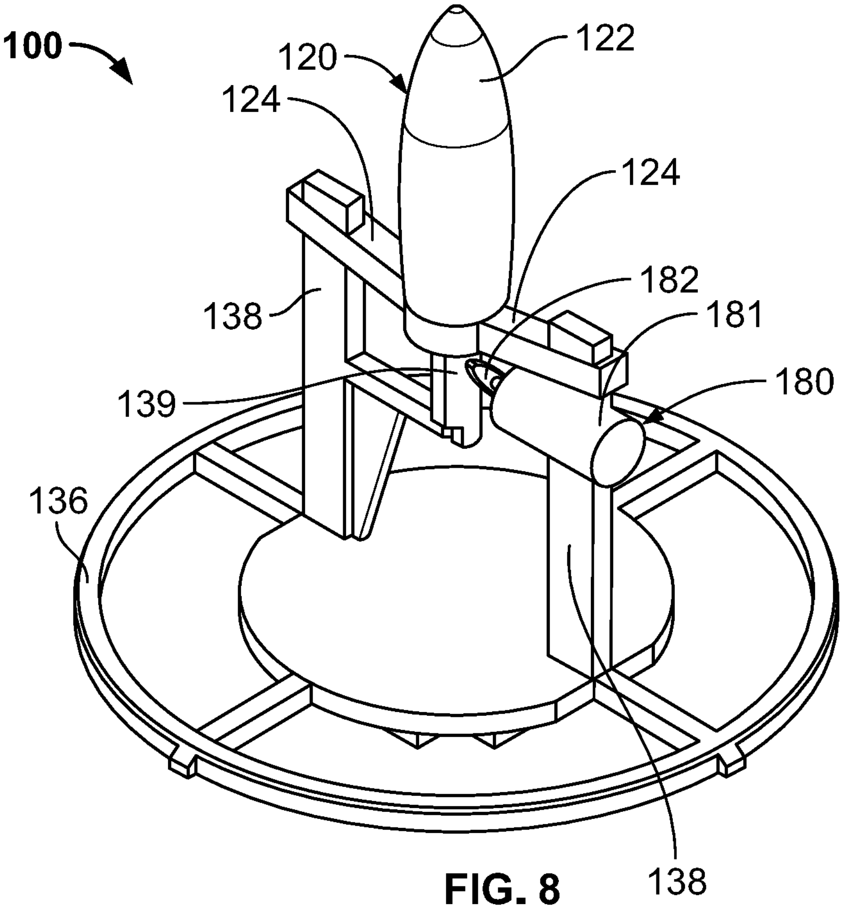
FIG. 8 illustrates a perspective view of a portion of the candle of FIG. 1, according to embodiments.
Figure 9:
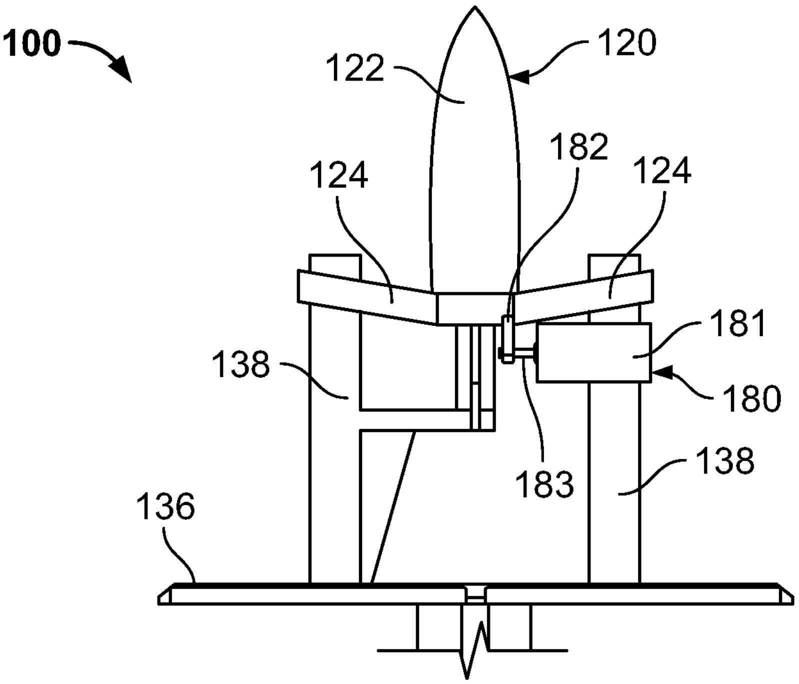
FIG. 9 illustrates a side view of a portion of the candle of FIG. 1, according to embodiments.

FIGS. 8 and 9 are different views of candle 100 that induces motion in flame element 120 via motor 180. Instead of (or in addition to) electromagnet 140, motor 180 induces motion in flame element 120. Therefore, electromagnet 140 may be omitted. Coupler 150 may also be omitted as shown, but it is possible to include coupler 150 too.

Motor body 181 may be mounted to frame 130 (e.g., support 138). Shaft 183 may extend from body 181 and connect to cam 182 (which may extend at a non-zero angle from shaft 183). Movement of flame element 120 may be effected when motor 180 is turned ON. Cam 182 may push flame element 120 or any other parts coupled to it (e.g., coupler 150, which is not shown in FIGS. 8 and 9). In the illustrated example of cam 182 engaging flame element 120 directly, when cam 182 strikes flame element 120, flame element 120 will move. When cam 182 is removed from flame element 120, flame element 120 will tend to return to its original position because of the elasticity of support arms 124. This process is repeated as cam periodically engages flame element 120.

Additional circuitry (not shown) may be mounted at least partially on a circuit board, which may be located near the bottom of candle 100 (e.g., on or in base 132 of frame 130). Additional circuitry may be electrically or physically connected to user interface 102, electromagnet 140, light source 160, and/or motor 180. Additional circuitry may control operations of candle 100 as described above. Additional circuitry may include wireless receivers/transceivers (e.g., WiFi or Bluetooth), solar cell(s), speakers, or the like. Wires between additional circuitry and other components may traverse along or inside of riser 134 (i.e., riser would have a hollow region). Wires may be routed to electromagnet 140, light source 160, and/or motor 180 in such a way.

Figure 3:
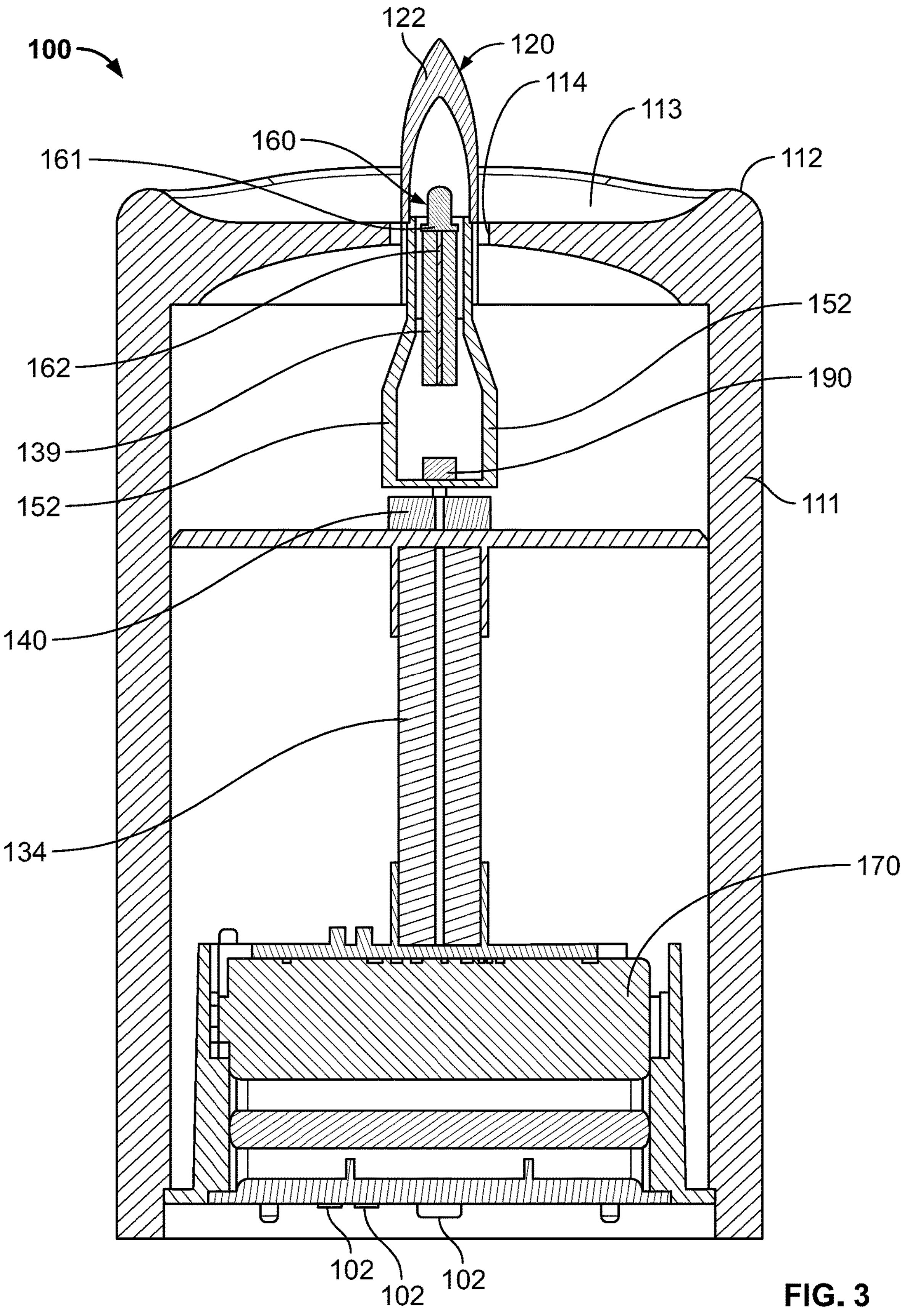
FIG. 3 illustrates a front cross-sectional view of the candle of FIG. 1, according to embodiments.
Figure 4:
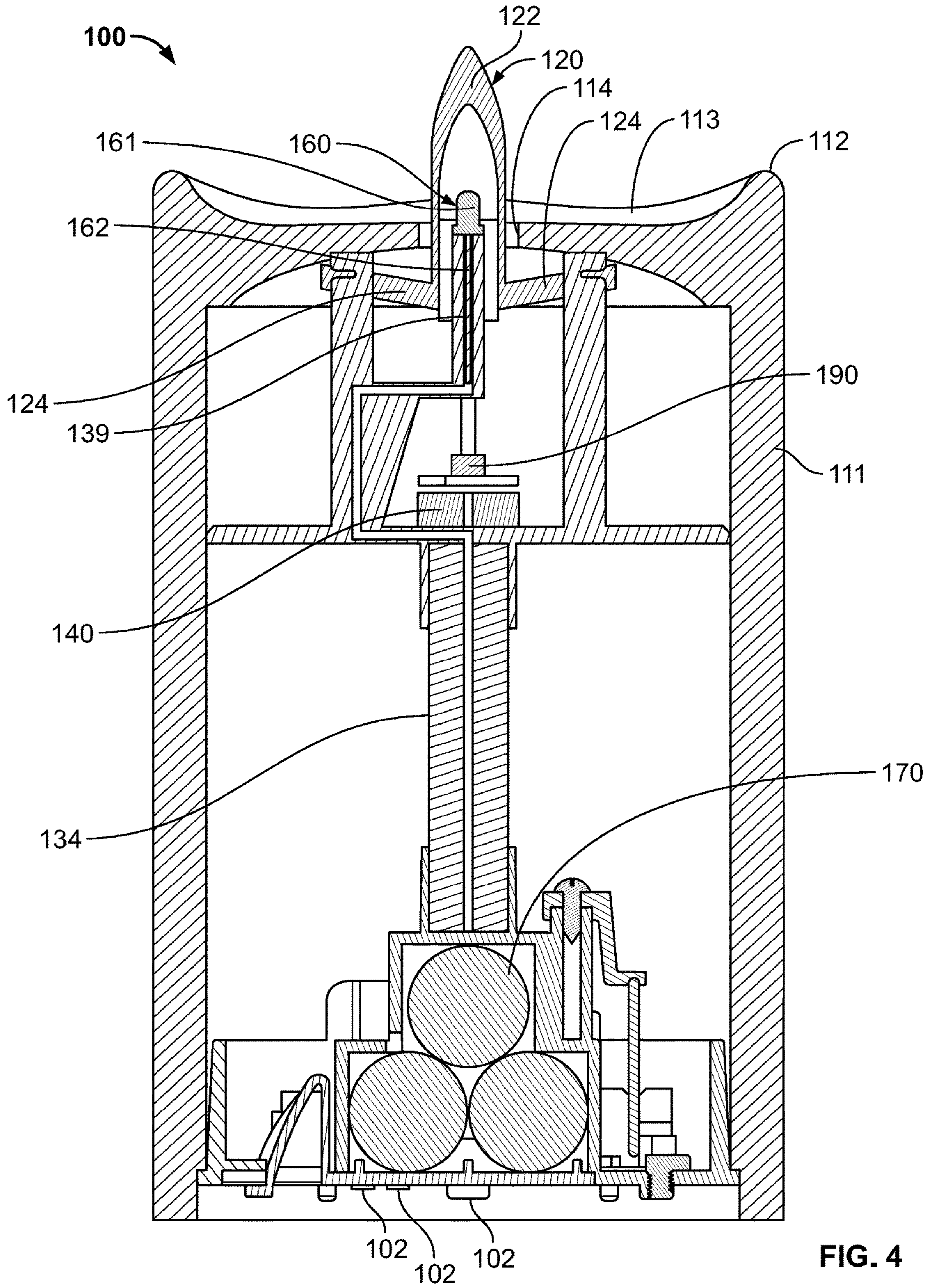
FIG. 4 illustrates a side cross-sectional view of the candle of FIG. 1, according to embodiments.
Figure 5:
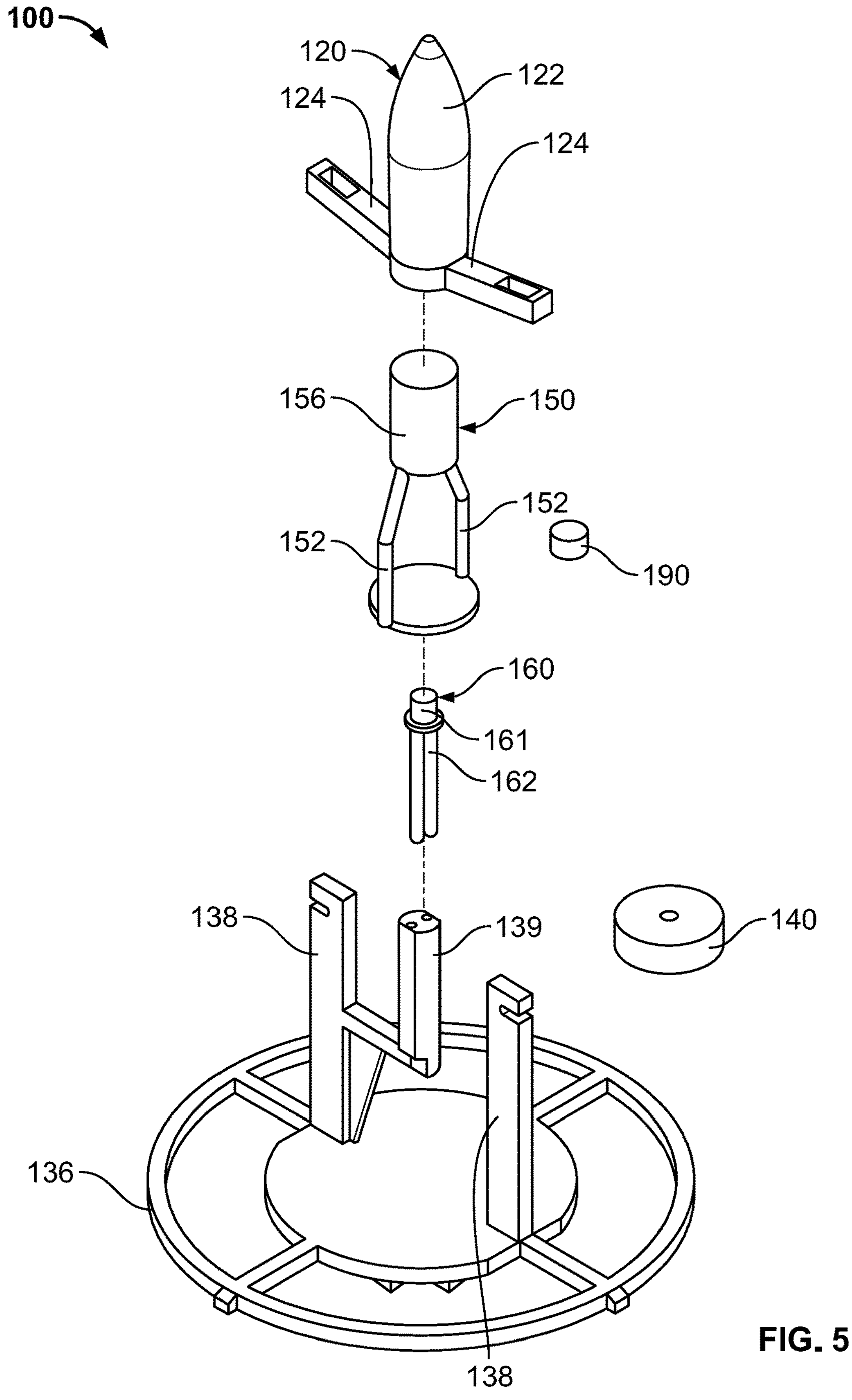
FIG. 5 illustrates an exploded view of a portion of the candle of FIG. 1, according to embodiments.
Figure 6:
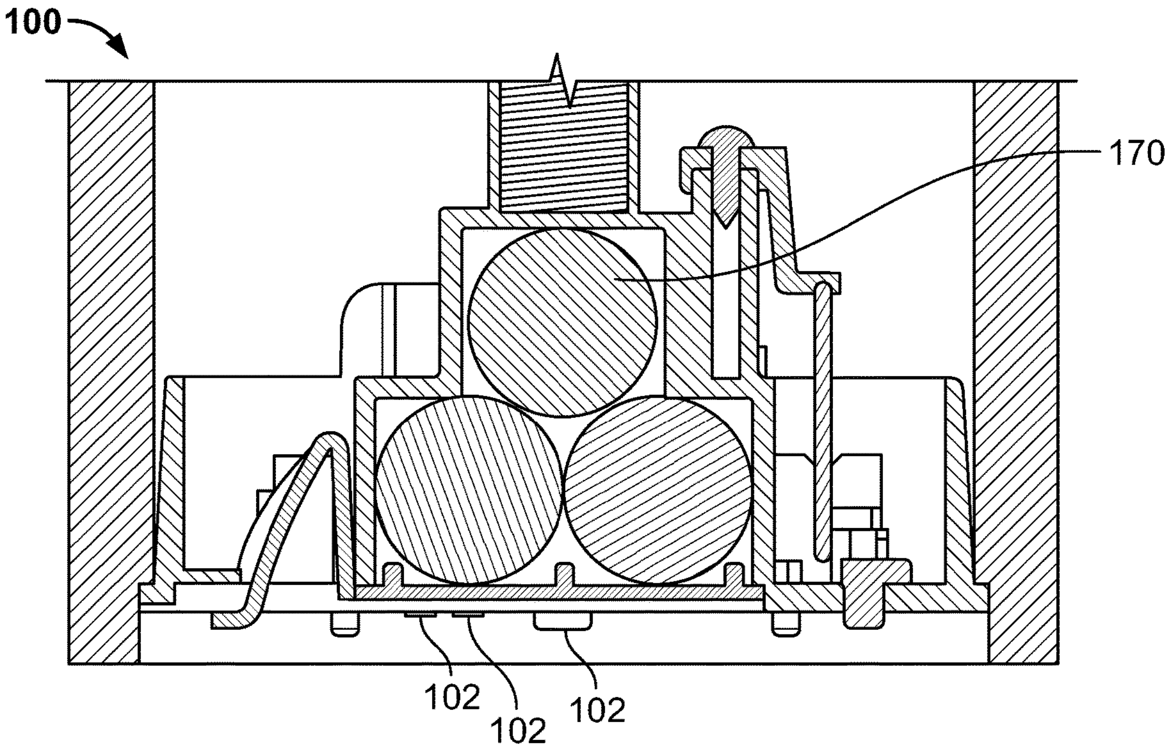
FIG. 6 illustrates a side cross-sectional view of the candle of FIG. 1, according to embodiments.
Figure 7:
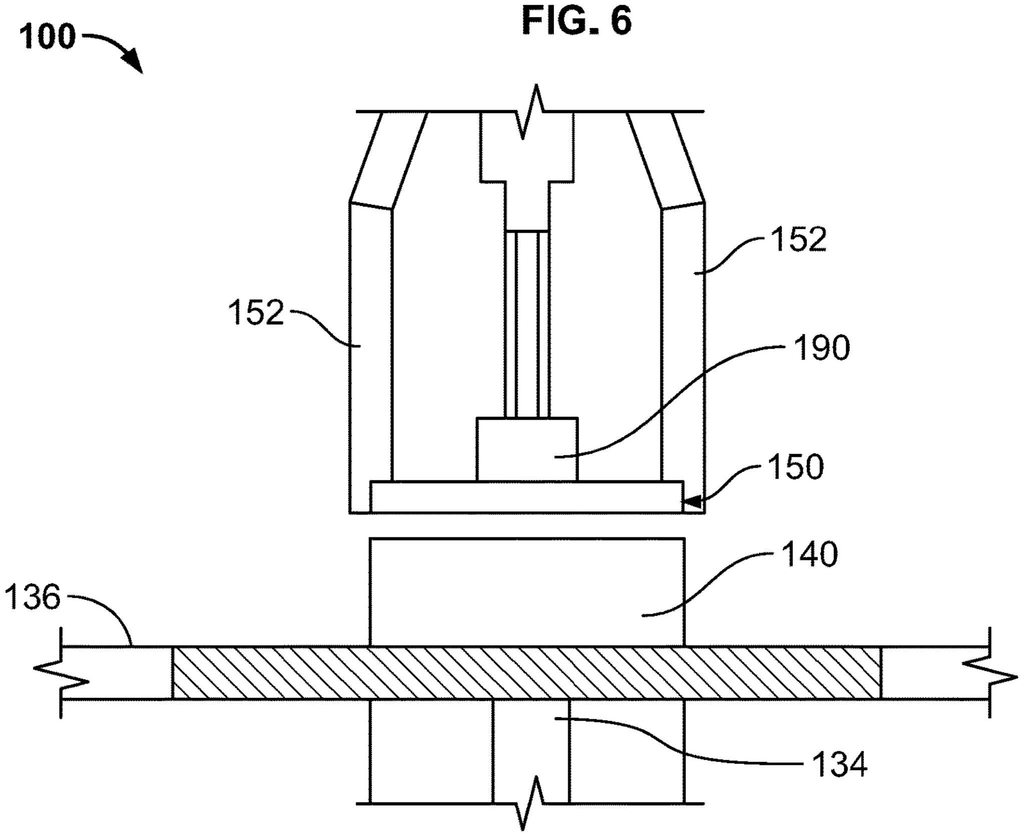
FIG. 7 illustrates a front view of a portion of the candle of FIG. 1, according to embodiments.

Candle 100 may further include user interface 102 (FIGS. 3, 4, and 6). User interface 102 may include one or more buttons, switches, sensors, or the like to implement functions like turning candle 100 ON/OFF, initiating a timer, changing a character of the light (color-changing, flickering, or the like), implement wireless functionality (e.g., WiFi or Bluetooth), implement sound, or the like. User interface 102 may provide inputs to circuitry (not shown) that controls operation of candle 100. User interface 102 may provide feedback to user through one or more LEDs, displays, and/or sounds.

Figure 10:
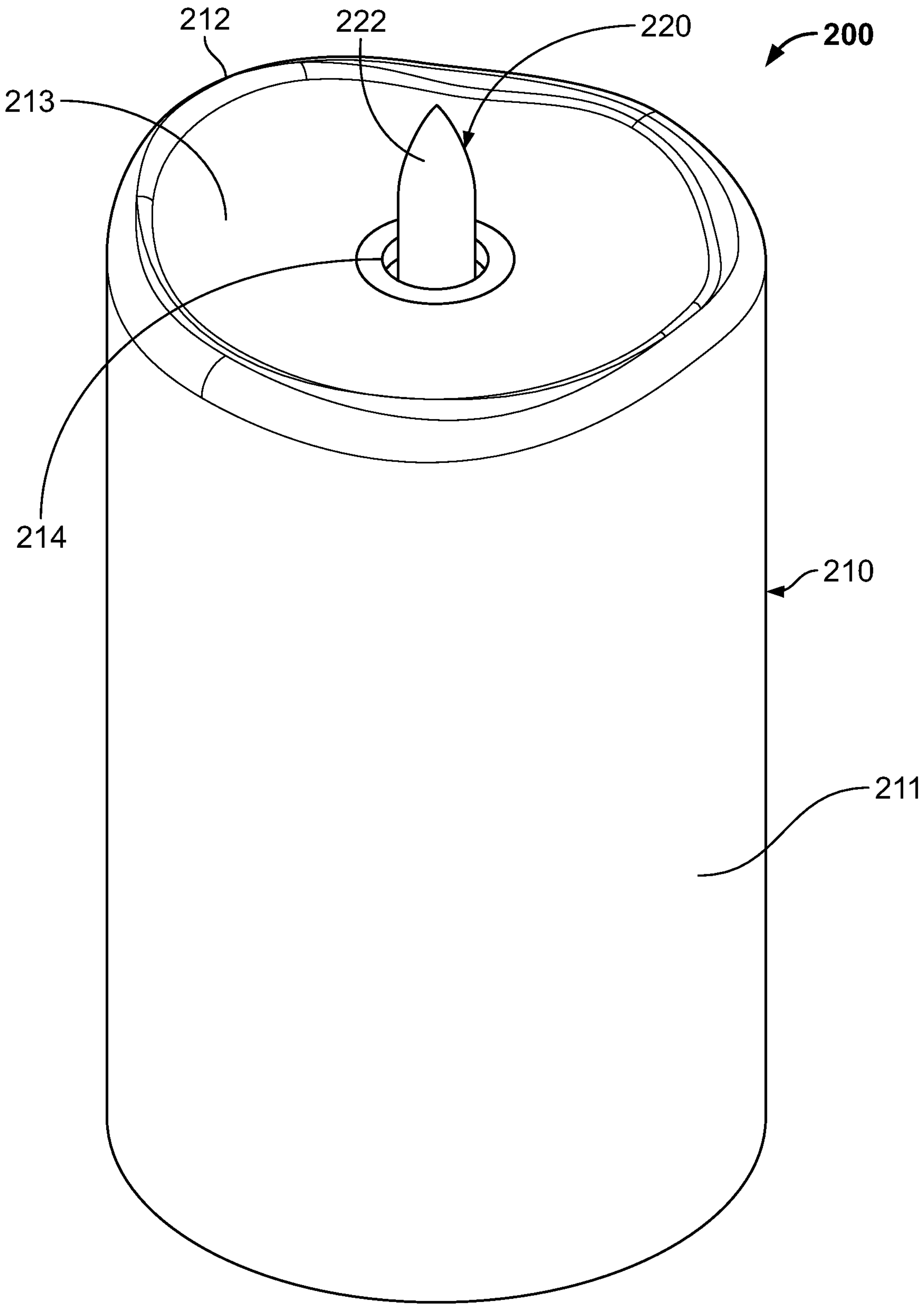
FIG. 10 illustrates a perspective view of an exterior of a candle, according to embodiments.

FIGS. 10-19 illustrate different views and embodiments of candle 200. Candle 200 may differ from candle 100 at least in part in that candle 200 uses spring 243 to move flame element 220. As shown in FIG. 10, candle 200 includes body 210 and flame element 220 (e.g., an element designed to present an illusion of a flame to a viewer). Body 210 includes sidewall 211, upper rim 212, upper surface 213, and aperture 214 in upper surface 213. Body 210 may include one or more interior regions within sidewall 211 and upper surface 213. Upper surface 213 may be recessed such that aperture 214 is at a lower elevation than at least part of rim 212. Upper surface 213, when recessed, may give the appearance that candle 200 that has been used and some of the wax has been consumed (that is, if candle 200 was not a flameless candle, but a conventional, flamed candle).

Figure 11:
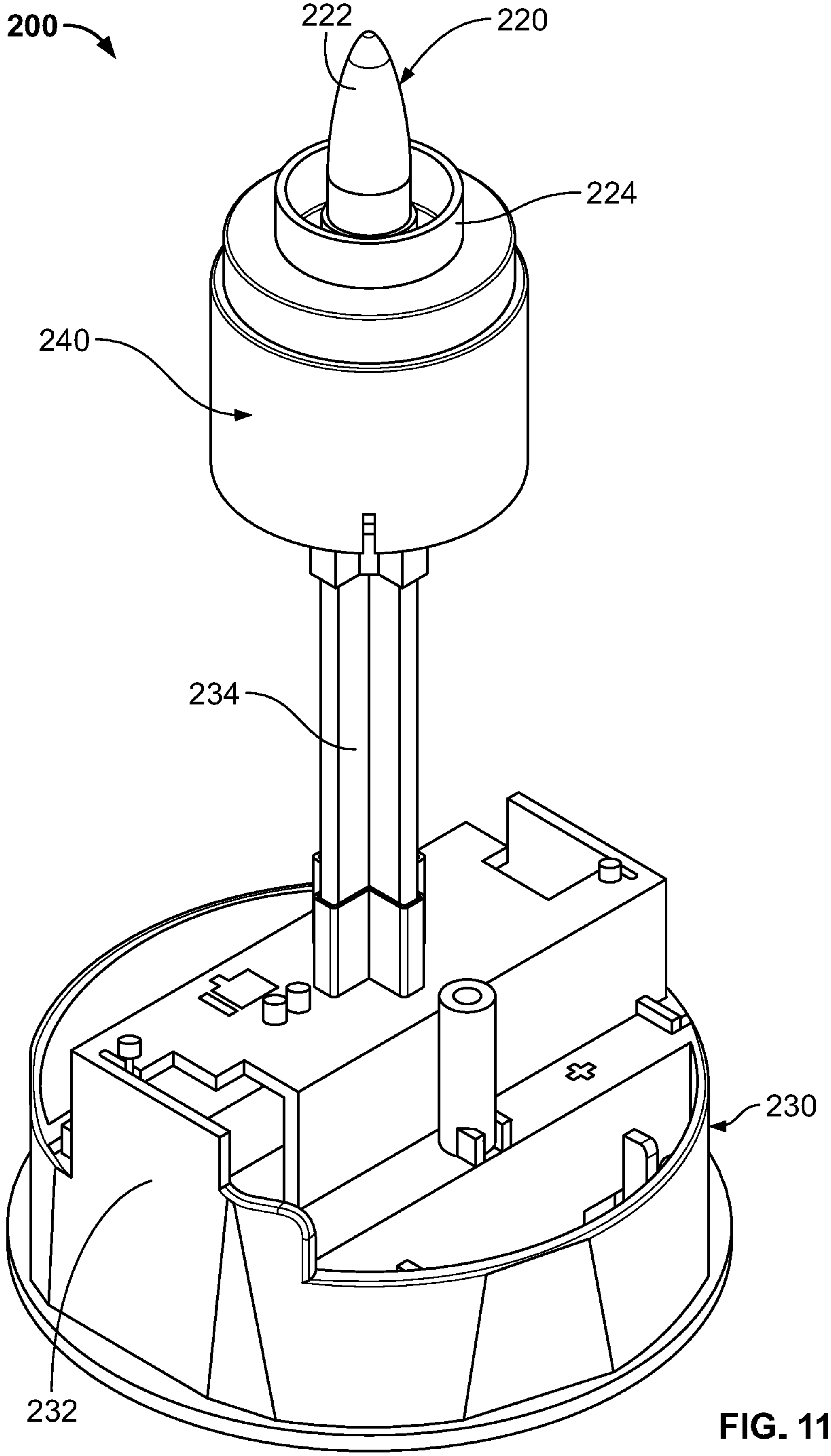
FIG. 11 illustrates a perspective view of an interior of the candle of FIG. 10, according to embodiments.

FIG. 11 shows a perspective view of candle 200 without body 210. Candle 200 may include frame 230, which comprises base 232 and riser 234, which may be similar to frame 130, base 132, and riser 134. Candle 200 further may include motion assembly 240 and flame element 220. Flame element 220 may be formed of a rigid material and may be relatively rigid. Flame element 220 may include a flame-shaped portion 222 and a collar 224. Flame element 220 may be two separate pieces attached (as shown, flame-shaped portion 222 and collar 224), or flame element 220 may be one integrated piece. Flame element 220 may comprise a translucent or transparent material to pass light from the interior to the exterior. Flame element 220 (e.g., flame-shaped portion 222). may have a hollow interior region. Flame element 220 may receive light directly on its exterior surface instead of the interior region or surface.

Figure 12:
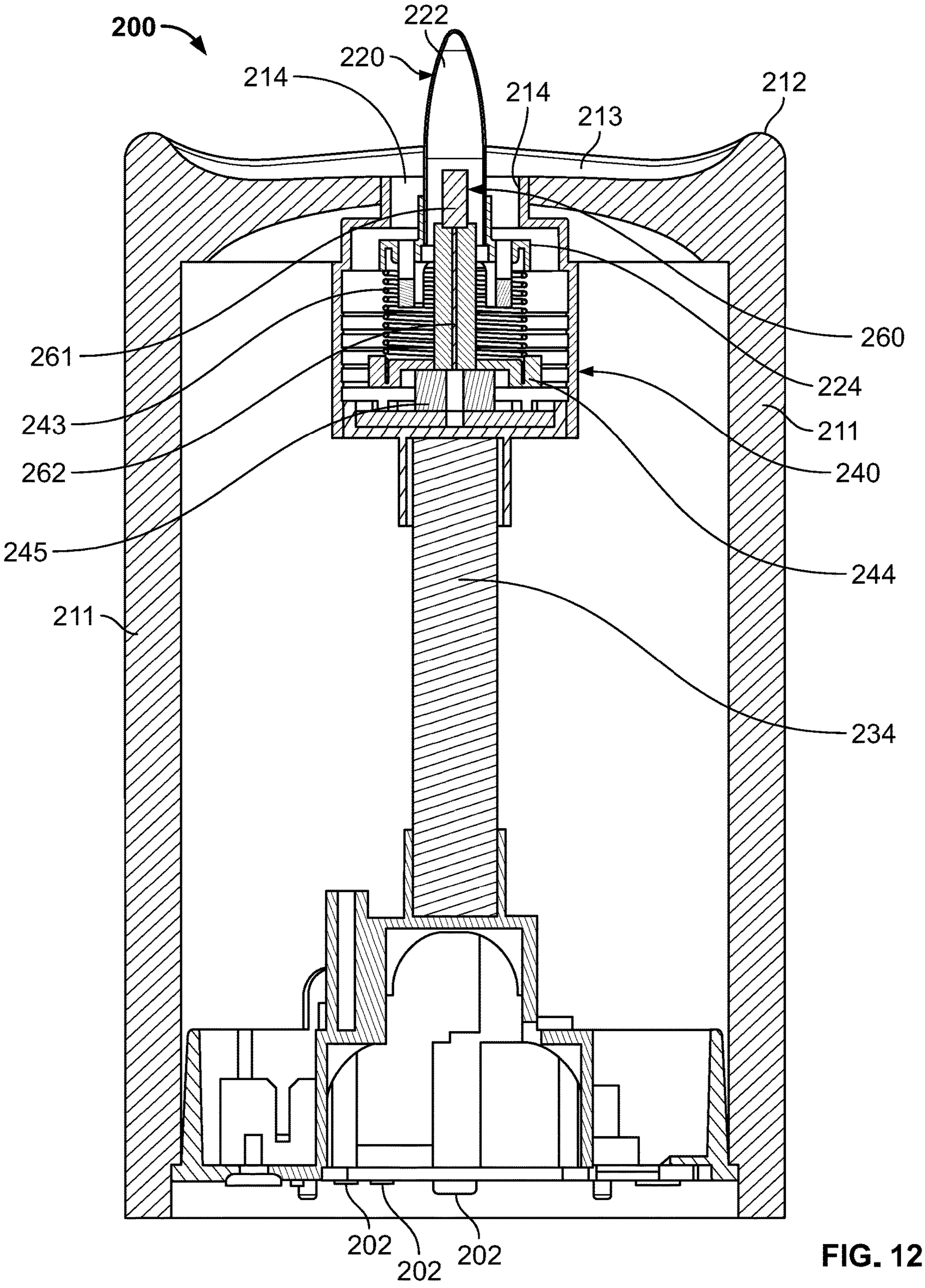
FIG. 12 illustrates a front cross-sectional view of the candle of FIG. 10, according to embodiments.
Figure 13:
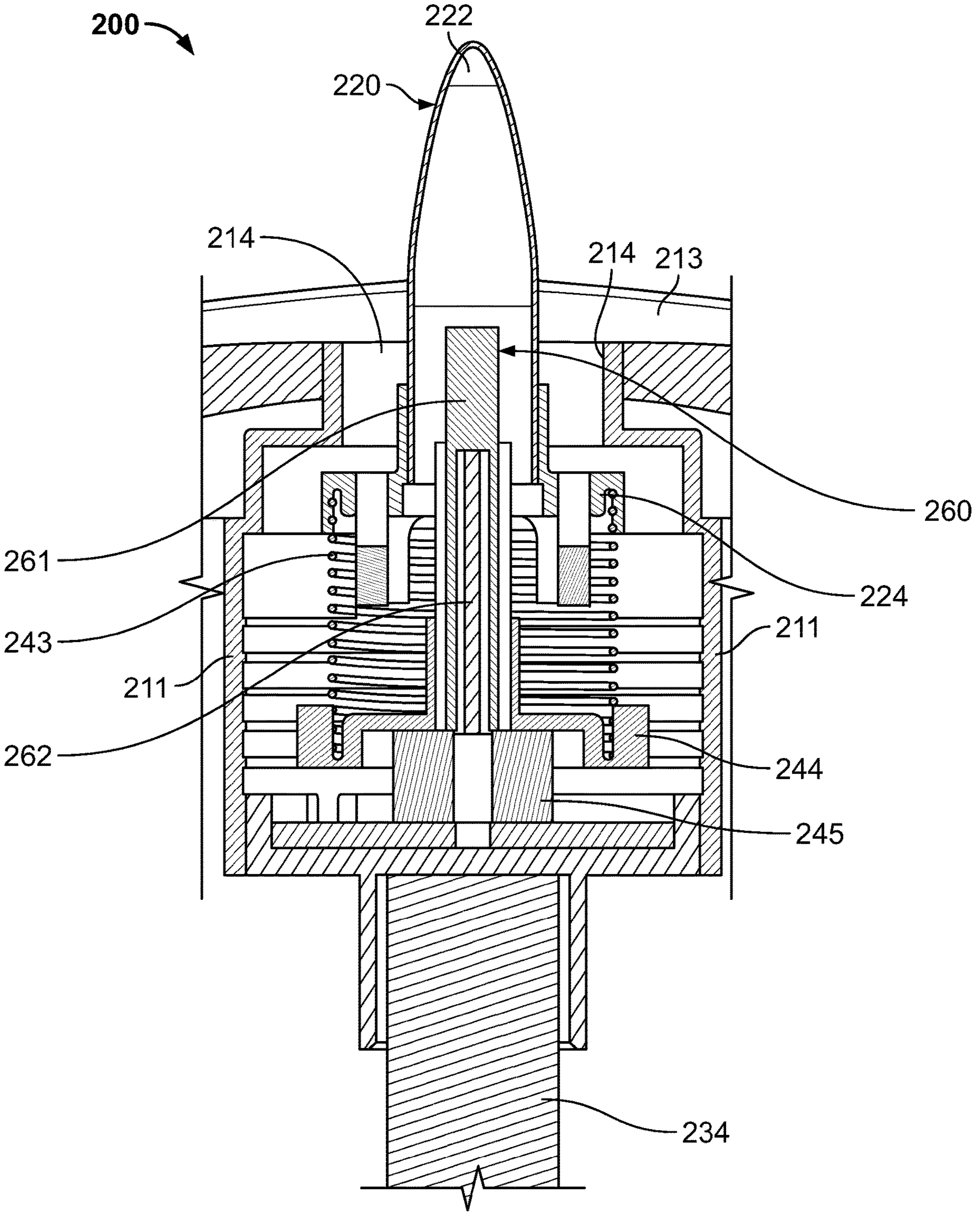
FIG. 13 illustrates a front cross-sectional view of a portion of the candle of FIG. 10, according to embodiments.
Figure 14:
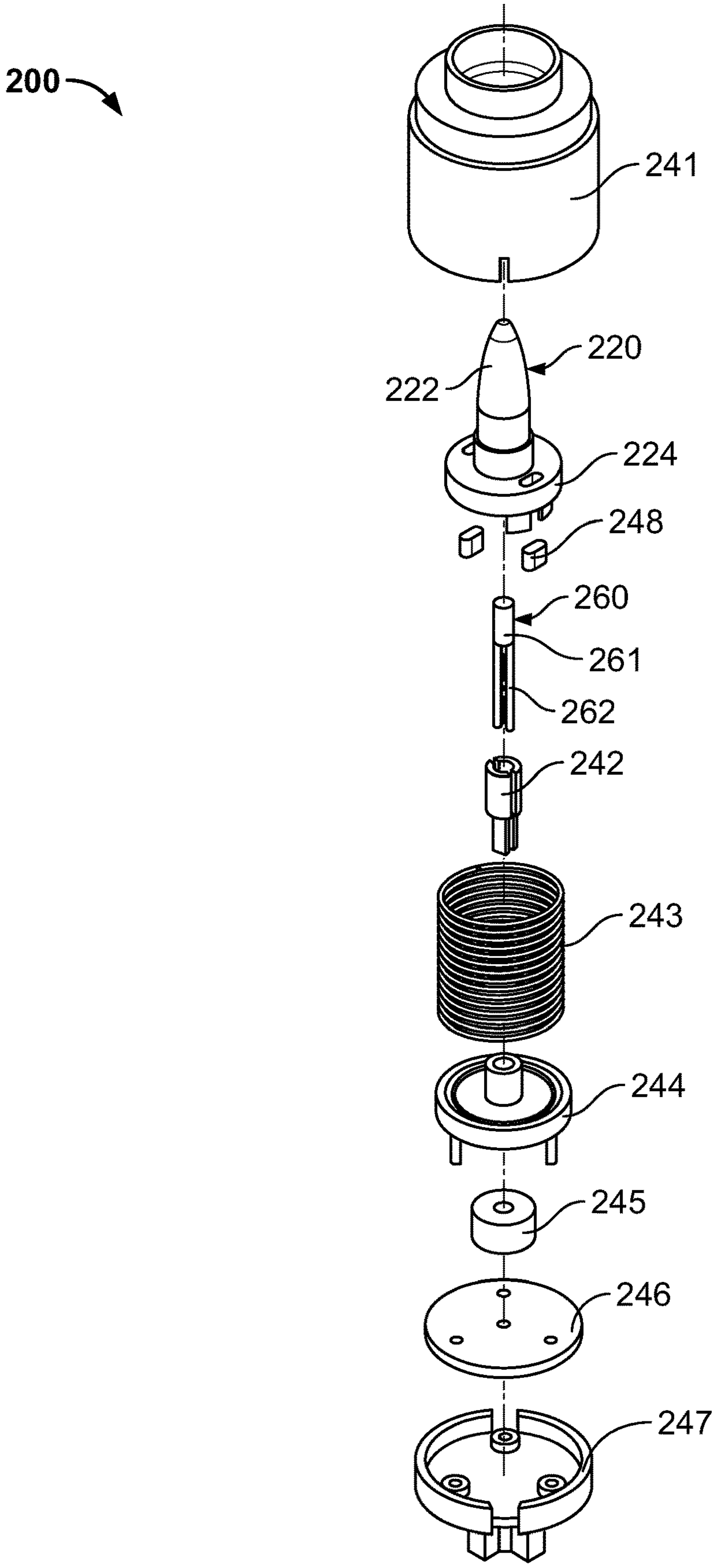
FIG. 14 illustrates an exploded view of a portion of the candle of FIG. 10, according to embodiments.

FIG. 12 shows a cross-sectional view of candle 200, and FIG. 13 is a zoomed-in view of a portion of FIG. 12. FIG. 14 is an exploded view of a portion of FIG. 13. These figures further show light source 260, which may include body 261 and leads 262. Light source 260 may be similar to light source 160, including that light source 160 may not move with respect to candle body 110 during operation. Light source 260 may project light (either directly or through a light pipe) into an interior region of flame element 220, which may then pass the light to the exterior. According to another technique, light is first projected onto an exterior surface of light source 260. A portion of flame element 220 may be shaped to resemble a candle flame and may extend upwardly from or through aperture 214 in upper surface 213 of body 210. Flame element 220 may include an interior region, an interior surface and an exterior surface. Flame element 220 may receive light emitted from light source 260 at the interior surface of the interior region, and allow at least a portion of the light to pass through to the exterior surface. Body 261 of light source 260 may be positioned within the interior region of flame element 220. Light source 260 may be optically coupled with a light pipe (not shown) that pipes the light to a different location from which it is emitted towards flame element 220 (e.g., the light source may be outside or below the interior region of flame element 220, and a light pipe may pipe the light to a location inside of the interior region). Light may also be projected onto an external surface of flame element 220 (not shown). In such an arrangement, flame element 220 could be substantially flat or not have an interior region that receives light.

Figure 19:
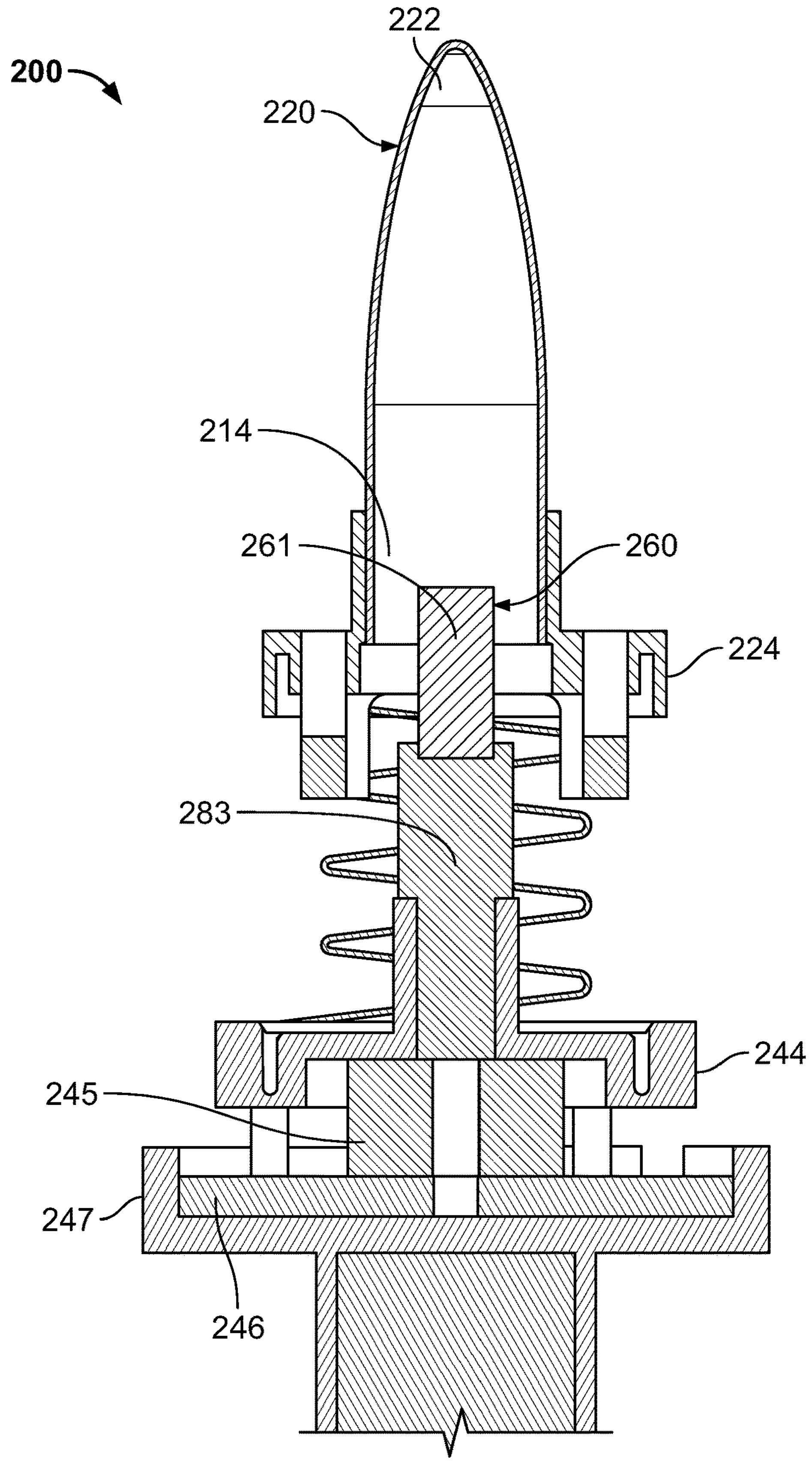
FIG. 19 illustrates a front cross-sectional view of a portion of the candle of FIG. 10, according to embodiments.

Also shown is motion assembly 240, which includes flame element 220 and light source 260, as well as various other components, including casing 241, light source support 242, spring 243, spring support 244, electromagnet 245, electromagnet support 246, base 247, and magnets 248. Base 247 may receive riser 234. Electromagnet support 246 may be supported by base 247. Electromagnet 245 may be attached to or supported by electromagnet support 246. Wires (not shown) may be fed into motion assembly 240 to power light source 260 and electromagnet 245 (e.g., in ways similar to candle 100). Spring support 244 may be supported by electromagnet support 246, and may support spring 243. Spring support 244 may have a groove to receive a portion of spring 243 (e.g., a portion of one or more spring coils). Spring 243 may be a coil spring or other type of spring with memory, such as other types of bent or curved wires (in a coil shape or otherwise) or other types of flexible materials. FIG. 19 shows spring 243 that is not a coil. Light source support 242 may support or secure light source 260. Magnet(s) 248 may be attached to or incorporated in flame element 220 (e.g., received by collar 224, as shown). Flame element 220 may be supported by and/or receive spring 243. Further, flame element 220 may have an outer diameter that is smaller than the inner diameter of a portion of casing 241. This may allow casing 241 to secure flame element 220 so that it remains in a generally upright orientation. Further, casing 241 may have a shoulder that prevents flame element 220 from coming out of candle 200 when it is assembled. For example, as shown, collar 224 of flame element 220 may be blocked by the shoulder of casing 241. The shoulder of casing 241 may determine a maximum elevation of flame element 220 during operation. Casing 241 may have other feature(s) (e.g., portions that protrude inwardly) that stop upward motion of flame element 220 beyond a desired maximum elevation.

Figure 15:
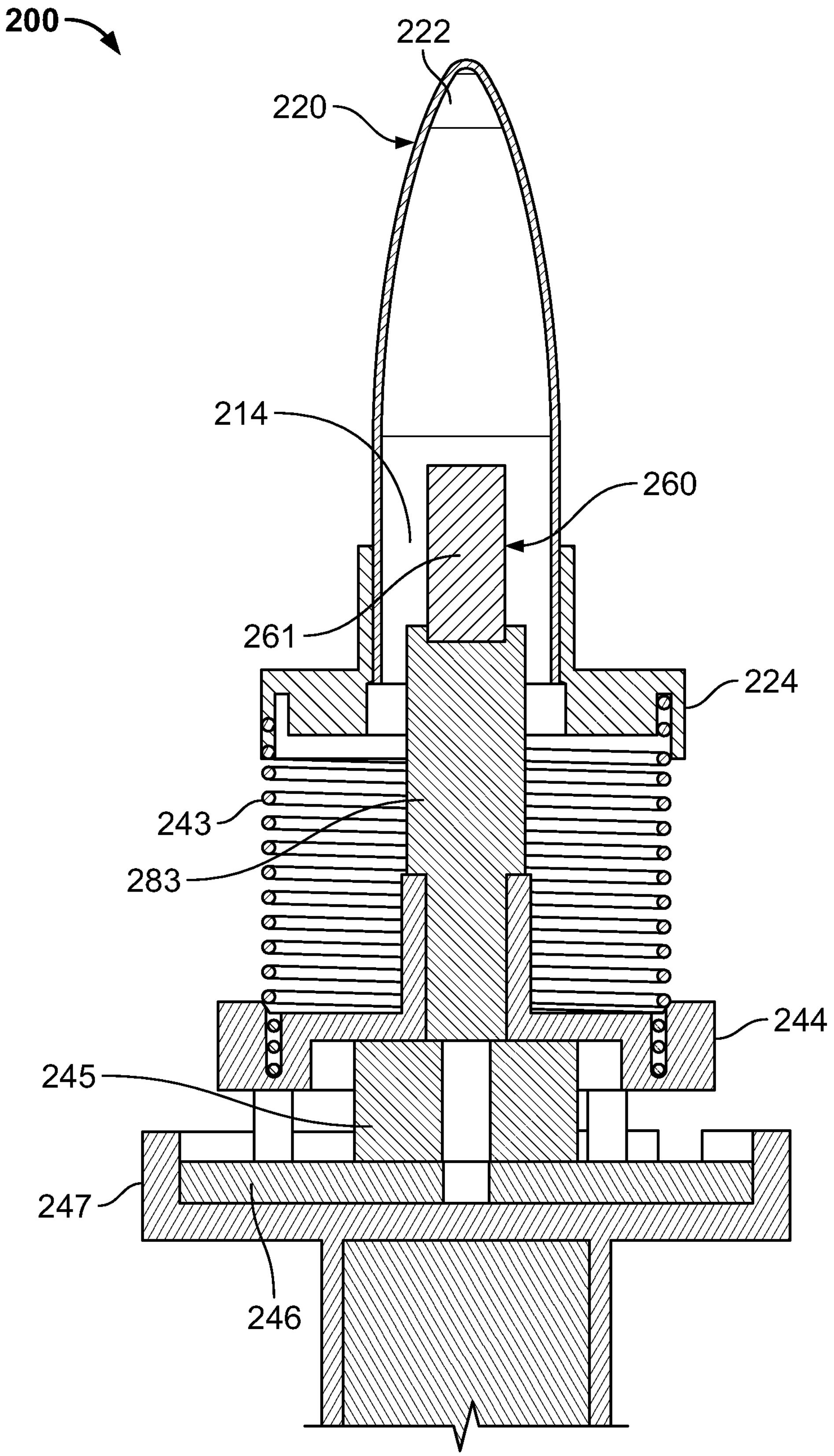
FIG. 15 illustrates a front cross-sectional view of a portion of the candle of FIG. 10, according to embodiments.

Electromagnet 245 may selectively induce a magnetic field (e.g., of varying intensity and/or polarity). Electromagnet 245 may include one or more printed circuit boards with one or more spiral traces, or one or more wire-wound devices. The magnetic field generated by electromagnet 245 induces other proximate magnets 248 to responsively move. Magnets 248 may be coupled to the flame element 220 (as shown in FIG. 14), coupled to spring 243, and/or integrated with spring 243. Spring 243 may include a non-magnetic material such that it does not substantially interact with a magnetic field. Alternatively (or in addition), spring 243 may include or be coupled to a ferromagnetic material such as steel, nickel, cobalt, or alloys thereof, that moves in response to the magnetic field. FIG. 15 shows a ferromagnetic spring 243 and no magnet coupled to flame element 220.

Figure 16:
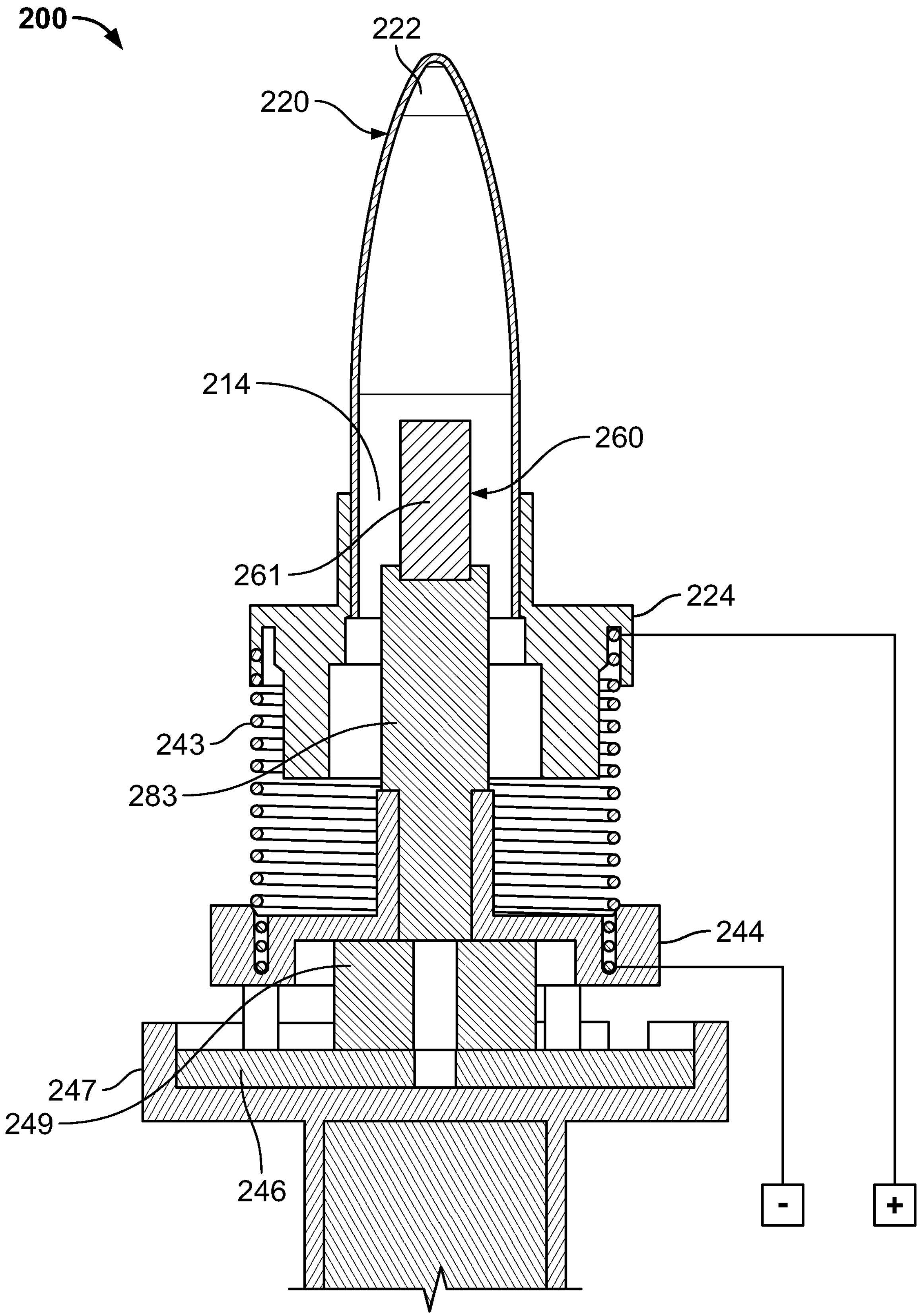
FIG. 16 illustrates a front cross-sectional view of a portion of the candle of FIG. 10, according to embodiments.

FIG. 16 shows an embodiment in which spring 243 that acts as an electromagnet when current is passed through it. Magnet 249 may be positioned in a non-moving portion of the candle (as shown) and/or coupled to flame element 220. Spring 243, acting as an electromagnet, will interact with other magnet(s) 249, thereby causing spring 243 and flame element 220 to move.

Figure 17:
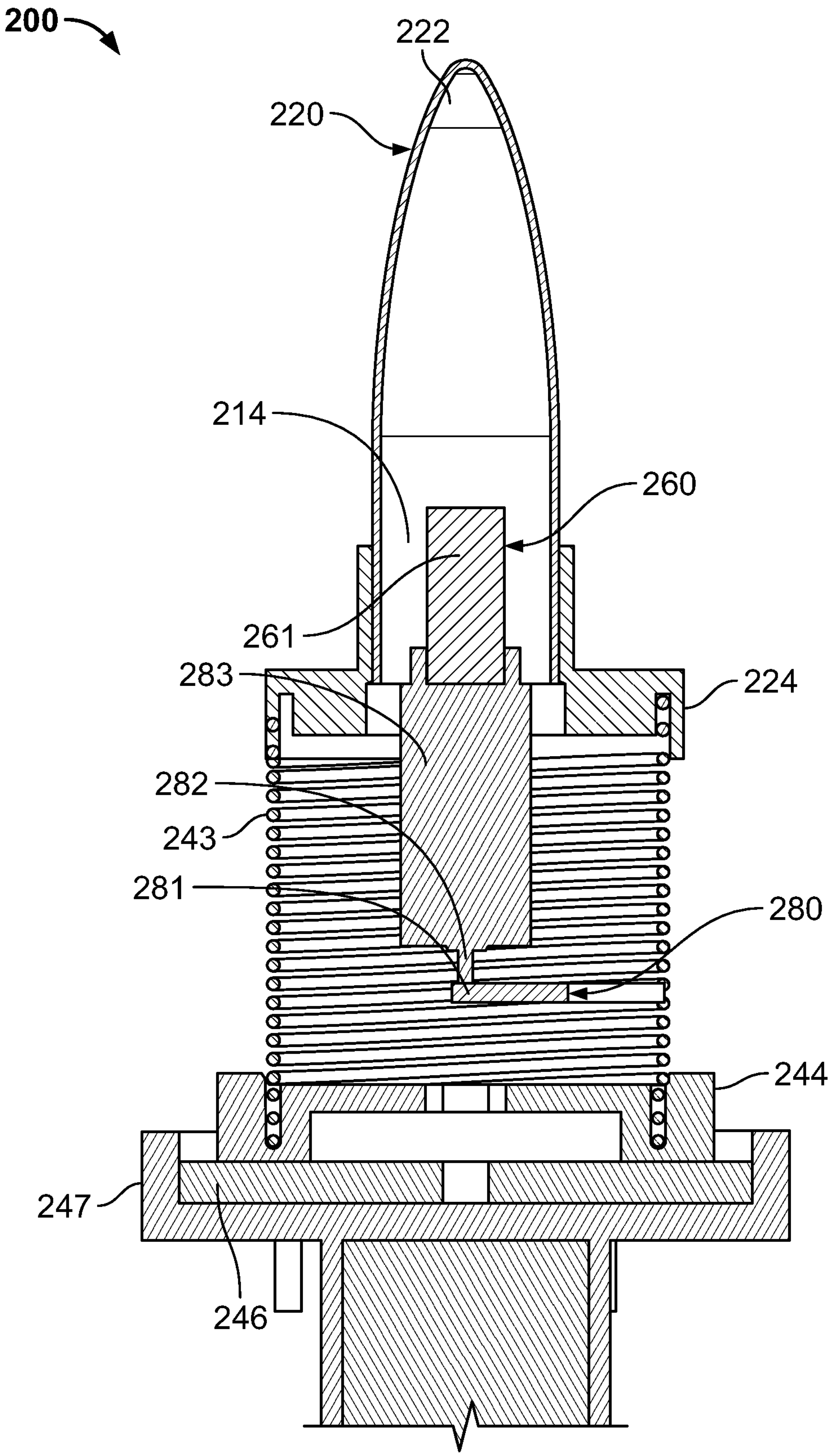
FIG. 17 illustrates a front cross-sectional view of a portion of the candle of FIG. 10, according to embodiments.
Figure 18:
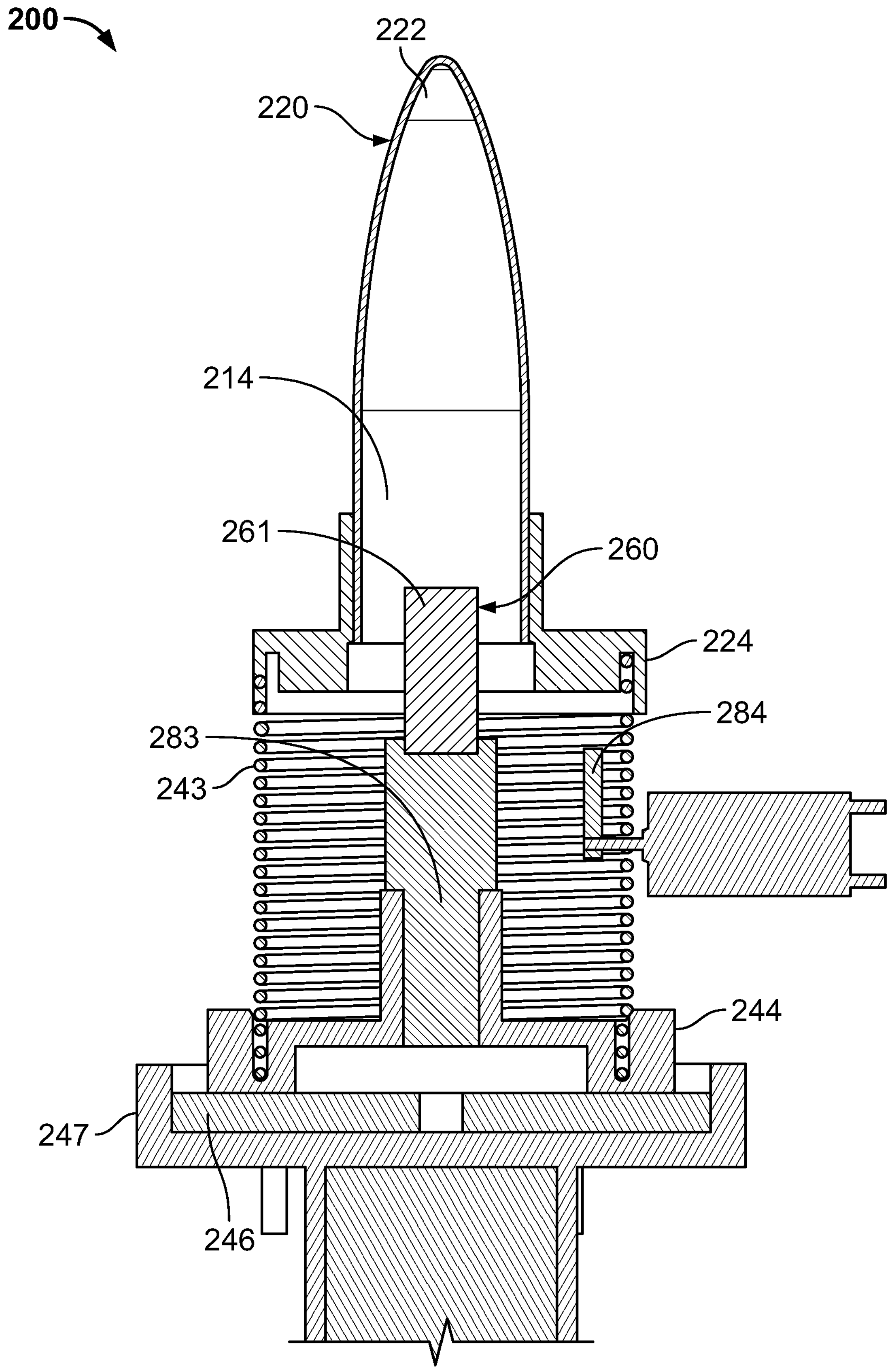
FIG. 18 illustrates a front cross-sectional view of a portion of the candle of FIG. 10, according to embodiments.

FIG. 17 shows an embodiment in which motor 280 imparts motion to spring 243, rather than electromagnet 245. Motor body 281 drives motor shaft 282, and load 283 is coupled to the motor shaft 282. Load 283 (e.g., off-centered load) causes the shaft 282 to vibrate (e.g., in an uneven manner due to an off-centered load). Shaft 282 and/or an actuator arm 284 (shown in FIG. 18) coupled thereto and/or body 281 may interact with spring 243 and/or flame element 220 to induce motion. Motor 280 is shown as positioned such that the shaft 282 is positioned within the interior of spring 243 (a coil spring as shown). FIG. 18 shows an embodiment in which motor body 281 and shaft 282 are at least partially outside of spring 243. FIG. 8 shows load 283 and FIG. 9 shows actuator arm 284, but these components can be used together or separately in various ways. The use of motor 280 may cause flame element 220 to move in a seemingly random manner to promote the illusion a candle flame.

For all embodiments herein, it may be possible for flame element 120, 220 to move in various degrees of movements, including three or more of back-forward, left-right, up-down, roll, yaw, or pitch. Flame element 120, 220 may not move left-right or back-forward without simultaneously moving in other degrees of freedom. Electromagnet 140, 245 may create magnetic pulses to generate an upward movement of flame element 120, 220 with subsequent natural oscillation in other directions that appear random. Opposite polarity electro-magnetic pulses may generate a downward movement of flame element 120, 220 with subsequent natural oscillation in other directions that appear random. The timing and frequency of the electro-magnetic pulses may allow for different movement behaviors so as to reproduce the effect of a natural flame.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims. Further, where components are indicated as being similar, it is understood that the same features may apply to both components, and for brevity and clarity, the description is not repeated.

The invention claimed is:

1. A flameless candle, comprising:
- a frame;
- a light source at a fixed location relative to the frame;
- a flame element including a body with an outer surface and an inner surface, the inner surface defining an interior region of the body that receives at least a portion of the light source and light projected by the light source, with at least some of the light passing through the interior surface, the body, and the outer surface;
- at least one flexible support arm securing the flame element to the frame;
- a magnet coupler spaced apart from the body of the flame element and including an upper surface;
- a magnet carried by the upper surface of the magnet coupler; and
- at least one elongated extension fixed directly to the body of the flame element and extending to the magnet coupler, the at least one elongated extension movable relative the frame to enable movement of the flame element relative to the frame.

2. The flameless candle of claim 1, further comprising:
- an electromagnet that interacts with the magnet in a manner that causes the magnet, the at least one elongated extension, and the flame element to move.

3. The flameless candle of claim 2, wherein the magnet coupler and the at least one elongated extension transfer movement of the magnet to the flame element.

4. The flameless candle of claim 1, wherein the light source does not move.

5. The flameless candle of claim 1, wherein the at least one elongated extension comprises two elongated extensions.

6. The flameless candle of claim 1, wherein the at least one elongated extension and the flame element are integrated.

7. The flameless candle of claim 1, further comprising:
- at least one support arm extending from the flame element.

8. The flameless candle of claim 7, wherein the at least one support arm comprises a flexible metal.

9. The flameless candle of claim 1, wherein the flame element moves in at least three degrees of freedom.

10. The flameless candle of claim 9, wherein the flame element moves in up-down, roll, yaw, and pitch degrees of freedom.

11. A flameless candle, comprising:
- a light source at a fixed location;
- a flame element including an exterior surface, an interior surface, and an interior region defined by the interior surface and that receives at least a portion of the light source and light from the light source, with the light to passing from the interior surface through to the exterior surface;

at least one flexible support arm securing the flame element to a non-moving portion of the flameless candle:

at least one elongated extension including a first end and a second end, the first end being fixed to the flame element;

a magnet coupler located beneath the flame element and including an upper surface, the second end of the at least one elongated extension being coupled to the magnet coupler such that the at least one elongated extension spaces the magnet coupler apart from the flame element and such that the flame element and the at least one elongated extension move together with respect to the light source and the non-moving portion of the flameless candle; and a magnet carried by the upper surface of the magnet coupler.

12. The flameless candle of claim 11, further comprising:

an electromagnet that selectively induces the magnet to move.

13. The flameless candle of claim 12, wherein the magnet is carried by the magnet coupler at a location that enables the magnet to interact with a magnetic field generated by the electromagnet in a manner that selectively induces the magnet to move, thereby causing the at least one elongated extension and the flame element to move.

14. The flameless candle of claim 13, wherein the magnetic field generated by the electromagnet is modulated over time to cause the at least one elongated extension and the flame element to move in directions that appear random.

15. The flameless candle of claim 12, wherein the magnet is mechanically secured to the magnet coupler.

16. The flameless candle of claim 11, wherein the light source does not move.

17. The flameless candle of claim 11, wherein the flame element moves in at least three degrees of freedom.

18. The flameless candle of claim 17, wherein the flame element moves in up-down, roll, yaw, and pitch degrees of freedom.

19. The flameless candle of claim 11, wherein the at least one flexible support arm comprises a polymeric material or a flexible metal.

20. The flameless candle of claim 11, wherein the at least one flexible support arm comprises three or more flexible support arms.

* * * * *